United States Patent
Lugo et al.

(10) Patent No.: US 12,516,141 B2
(45) Date of Patent: Jan. 6, 2026

(54) POLYETHYLENE COMPOSITIONS

(71) Applicant: Dow Global Technologies LLC, Midland, MI (US)

(72) Inventors: Elva L. Lugo, Lake Jackson, TX (US); Sanjib Biswas, Manvel, TX (US); Russell Cooper, Pearland, TX (US); Rajen Patel, Lake Jackson, TX (US); Peter S. Martin, Houston, TX (US); Stephanie M. Whited, Charleston, WV (US)

(73) Assignee: Dow Global Technologies LLC, Midland, MI (US)

( * ) Notice: Subject to any disclaimer, the term of this patent is extended or adjusted under 35 U.S.C. 154(b) by 556 days.

(21) Appl. No.: 18/003,423

(22) PCT Filed: Feb. 5, 2021

(86) PCT No.: PCT/US2021/016809
§ 371 (c)(1),
(2) Date: Dec. 27, 2022

(87) PCT Pub. No.: WO2022/005532
PCT Pub. Date: Jan. 6, 2022

(65) Prior Publication Data
US 2023/0235104 A1  Jul. 27, 2023

Related U.S. Application Data

(60) Provisional application No. 63/046,396, filed on Jun. 30, 2020.

(51) Int. Cl.
*C08F 210/02* (2006.01)
*C08F 2/00* (2006.01)
(Continued)

(52) U.S. Cl.
CPC ............ *C08F 210/02* (2013.01); *C08F 2/001* (2013.01); *C08F 2/06* (2013.01); *C08F 4/64193* (2013.01);
(Continued)

(58) Field of Classification Search
None
See application file for complete search history.

(56) References Cited

U.S. PATENT DOCUMENTS

| 3,645,992 A | 2/1972 | Elston |
| 3,914,342 A | 10/1975 | Mitchell |

(Continued)

FOREIGN PATENT DOCUMENTS

| CN | 105713278 A | 6/2016 |
| CN | 108059763 A | 5/2018 |

(Continued)

OTHER PUBLICATIONS

Japanese Office Action dated Jan. 21, 2025, pertaining to JP Patent Application No. 2022-580466, 13 pgs.

(Continued)

*Primary Examiner* — Eli D. Strah
(74) *Attorney, Agent, or Firm* — Dinsmore & Shohl LLP

(57) ABSTRACT

Embodiments of polyethylene compositions and articles comprising polyethylene compositions are disclosed. The polyethylene compositions may include a first polyethylene fraction area defined by an area in the elution profile in a temperature range of 70° C. to 97° C. via improved comonomer composition distribution (iCCD) analysis method; a first peak in the temperature range of 70° C. to 97° C. in the elution profile; a second polyethylene fraction area defined by an area in the elution profile in a temperature range of 97° C. to 110° C.; and a second peak in the temperature range of 97° C. to 110° C. The polyethylene composition may have (Continued)

a density of 0.935 g/cm³ to 0.955 g/cm³ and a melt index ($I_2$) of 1.0 g/10 minutes to 10.0 g/10 minutes. A ratio of the first polyethylene fraction area to the second polyethylene fraction area may be less than 2.0.

15 Claims, 1 Drawing Sheet

(51) Int. Cl.
*C08F 2/06* (2006.01)
*C08F 4/64* (2006.01)
*C08L 23/08* (2025.01)
*C08L 23/0807* (2025.01)

(52) U.S. Cl.
CPC ....... *C08L 23/0815* (2013.01); *C08L 2203/30* (2013.01)

(56) References Cited

U.S. PATENT DOCUMENTS

| | | | |
|---|---|---|---|
| 4,076,698 A | 2/1978 | Anderson et al. | |
| 4,599,392 A | 7/1986 | McKinney et al. | |
| 5,272,236 A | 12/1993 | Lai et al. | |
| 5,278,272 A | 1/1994 | Lai et al. | |
| 5,582,923 A | 12/1996 | Kale et al. | |
| 5,733,155 A | 3/1998 | Sagawa | |
| 5,854,045 A | 12/1998 | Fang et al. | |
| 6,114,486 A | 9/2000 | Rowland et al. | |
| 6,969,741 B2 | 11/2005 | Lustiger et al. | |
| 7,201,864 B2 | 4/2007 | Weber et al. | |
| 7,307,126 B2 | 12/2007 | Lustiger et al. | |
| 7,381,783 B2 | 6/2008 | Loveday et al. | |
| 7,396,881 B2 | 7/2008 | Lustiger et al. | |
| 8,227,564 B2 | 7/2012 | Loveday et al. | |
| 8,492,498 B2 | 7/2013 | Buck et al. | |
| 8,907,018 B2 | 12/2014 | Bellehumeur et al. | |
| 9,102,819 B2 | 8/2015 | Kapur et al. | |
| 9,181,422 B2 | 11/2015 | Bellehumeur et al. | |
| 9,321,865 B2 | 4/2016 | Bellehumeur et al. | |
| 9,540,505 B2 | 1/2017 | Bellehumeur et al. | |
| 9,982,077 B2 | 5/2018 | Bellehumeur et al. | |
| 10,189,924 B2 | 1/2019 | Bellehumeur et al. | |
| 10,550,251 B2 | 2/2020 | Vantomme et al. | |
| 2005/0215719 A1* | 9/2005 | Lustiger | C08L 23/0815 525/240 |
| 2015/0141579 A1 | 5/2015 | Bellehumeur et al. | |
| 2015/0148491 A1* | 5/2015 | Kapur | C08L 23/06 525/240 |
| 2015/0344681 A1 | 12/2015 | Kapur et al. | |
| 2016/0108185 A1 | 4/2016 | Wang et al. | |
| 2016/0229964 A1 | 8/2016 | Bellehumeur et al. | |
| 2017/0158789 A1* | 6/2017 | Bellehumeur | C08F 110/14 |

FOREIGN PATENT DOCUMENTS

| | | |
|---|---|---|
| EP | 3157967 B1 | 11/2015 |
| WO | 2017040127 A1 | 3/2017 |
| WO | 2017151358 A1 | 9/2017 |
| WO | 2018017180 A1 | 1/2018 |
| WO | 2020106797 A1 | 5/2020 |
| WO | 2021026135 A1 | 2/2021 |

OTHER PUBLICATIONS

Singapore Search Report and Written Opinion dated Aug. 20, 2024, pertaining to SG Patent Application No. 11202261389X, 10 pgs.
Japanese Office Action dated Jul. 22, 2025, pertaining to JP Patent Application No. JP2022-580466, 6 pgs.
Brazil Office Action dated Aug. 28, 2024, pertaining to BR Patent Application No. BR 11 2022 027012-7, 10 pgs.
Japanese Office Action dated Jan. 21, 2025, pertaining to JP Patent Application No. 2022-580466, 12 pgs.
International Search Report and Written Opinion issued by the European Patent Office acting as International Searching Authority for International Patent Application No. PCT/US2021/016809 dated Apr. 30, 2021 (13 total pages).
Karjala, Teresa P., et al., "Detection of Low Levels of Long-Chain Branching in Polyolefins", ANTEC, pp. 887-891 (2008).
Korean Office Action dated Aug. 27, 2025, pertaining to KR Patent Application No. 10-2023-7003372, 20 pgs.

* cited by examiner

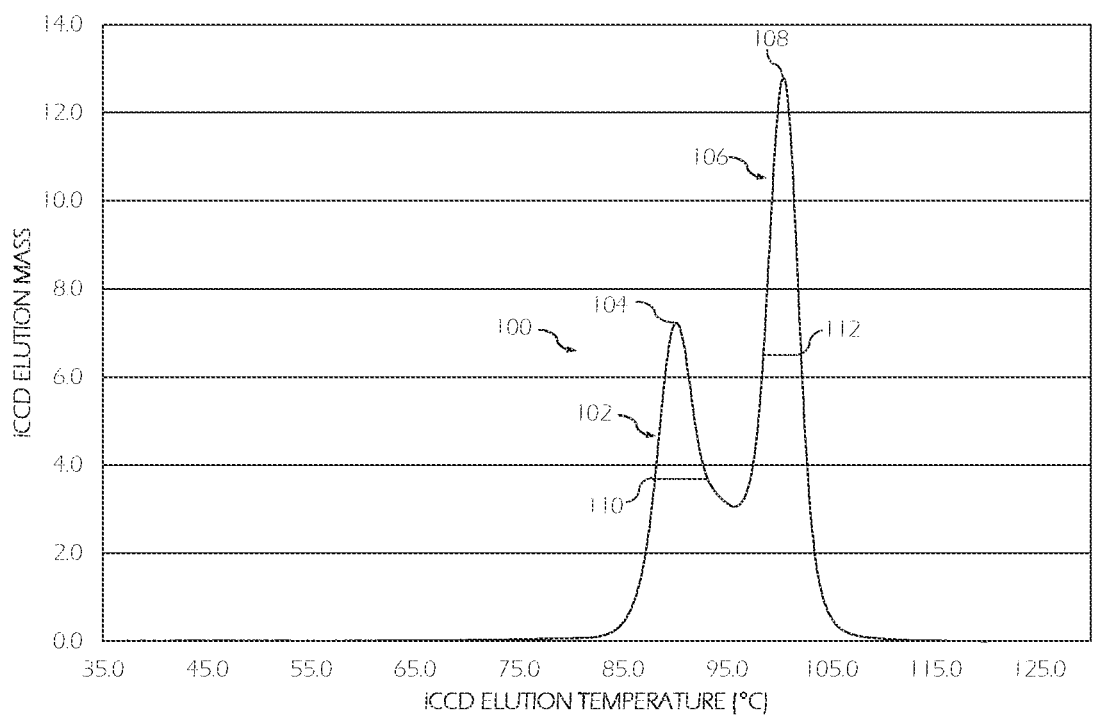

POLYETHYLENE COMPOSITIONS

CROSS-REFERENCE TO RELATED APPLICATIONS

This application is a National Stage Entry under 35 U.S.C. § 371 of International Patent Application No. PCT/US2021/016809, filed Feb. 5, 2021, which claims the benefit of U.S. Provisional Application Ser. No. 63/046,396 filed Jun. 30, 2020, both of which are hereby incorporated by reference in their entireties.

TECHNICAL FIELD

Embodiments described herein generally relate to polymers and, more specifically, to polyethylene compositions.

BACKGROUND

The use of polyolefin compositions in the formation of molded articles is generally known. Any conventional method may be employed to produce such polyolefin compositions. Various polymerization techniques using different catalyst systems have been employed to produce such polyolefin compositions suitable for the formation of articles.

SUMMARY

However, despite the research efforts in developing compositions suitable for the formation of articles, there is still a need for compositions having a balance of stiffness and performance properties that meet customer and industry requirements. Moreover, researchers continually seek solutions to allow for the reduction of material costs, such as, from down-gauging (i.e., using thinner wall thicknesses) or by reducing or eliminating relatively expensive materials. For example, down-gauging may be accomplished using polymeric resins with higher densities, but increasing density usually results in decreased environmental stress crack resistance (ESCR). Accordingly, there are needs for compositions having a balance of stiffness and performance properties that meet customer and industry requirements.

Embodiments of the present disclosure are directed to polyethylene compositions that may exhibit desirable stiffness without inhibiting performance properties, such as ESCR. As such, embodiments of the present disclosure may provide a polyethylene composition that, when utilized in the production of polymeric articles, may allow for reduced material costs resulting from said balance of stiffness and ESCR properties.

According to one or more embodiments, a polyethylene composition is provided. The polyethylene compositions may include a first polyethylene fraction area defined by an area in the elution profile in a temperature range of 70° C. to 97° C. via improved comonomer composition distribution (iCCD) analysis method; a first peak in the temperature range of 70° C. to 97° C. in the elution profile; a second polyethylene fraction area defined by an area in the elution profile in a temperature range of 97° C. to 110° C.; and a second peak in the temperature range of 97° C. to 110° C. The polyethylene composition may have a density of 0.935 g/cm$^3$ to 0.955 g/cm$^3$ and a melt index ($I_2$) of 1.0 g/10 minutes to 10.0 g/10 minutes. A ratio of the first polyethylene fraction area to the second polyethylene fraction area may be less than 2.0.

According to one or more embodiments, a polyethylene composition is provided. The polyethylene compositions may include a first polyethylene fraction in a temperature range of 70° C. to 97° C. in an elution profile via improved comonomer composition distribution (iCCD) analysis method, the first polyethylene fraction comprising a first peak, and wherein the first polyethylene fraction has a first fraction molecular weight ($Mw_{(iCCD,\ 70°\ C.-97°\ C.)}$); and a second polyethylene fraction in a temperature range of 97° C. to 110° C. in the elution profile, the second polyethylene fraction comprising a second peak. The polyethylene composition may have an overall molecular weight ($Mw_{(iCCD)}$), a density of 0.935 g/cm$^3$ to 0.955 g/cm$^3$, a melt index ($I_2$) of 1.0 g/10 minutes to 10.0 g/10 minutes. A ratio of the overall molecular weight ($Mw_{(iCCD)}$) to the first fraction molecular weight ($Mw_{(iCCD,\ 70°\ C.-97°\ C.)}$) may be less than 0.9.

According to one or more embodiments, an article is provided. The article may be a rotomolded or injection-molded article. The article may include the above polyethylene composition.

These and other embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 1 graphically depicts the elution profile of Polyethylene Composition 1, according to one or more embodiments presently described.

DETAILED DESCRIPTION

Specific embodiments of the present application will now be described. These embodiments are provided so that this disclosure will be thorough and complete and will fully convey the scope of the claimed subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference in its entirety). LDPE resins typically have a density in the range of 0.916 g/cm$^3$ to 0.940 g/cm$^3$.

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155 each of which are incorporated herein by reference in their entirety; the homogeneously branched linear ethylene polymer compositions such as those in U.S. Pat. No. 3,645,992 which is incorporated herein by reference in its entirety; the heterogeneously branched ethylene polymers such as those prepared according to the process disclosed in U.S. Pat. No. 4,076,698 which is incorporated herein by reference in its entirety; and blends thereof (such as those disclosed in U.S. Pat. Nos. 3,914,342 and 5,854,045 which are incorporated herein by reference in their entirety. The LLDPE resins can be made via gas-phase, solution-phase, or slurry polymerization or any combination thereof, using any type of reactor or reactor configuration known in the art.

The term "MDPE" refers to polyethylenes having densities from 0.930 g/cm$^3$ to 0.950 g/cm$^3$. MDPEs are typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent aryloxyether catalysts (typically referred to as bisphenyl phenoxy). It should be noted that MDPE may be used in one or more of the outer layers.

The term "HDPE" refers to polyethylenes having densities greater than 0.935 g/cm$^3$ and up to 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 g/cm$^3$ to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers plastomers generally have densities of 0.855 g/cm$^3$ to 0.912 g/cm$^3$.

"Blend," "polymer blend," and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Embodiments of polyethylene compositions will now be described. Embodiments of the presently-described polyethylene compositions, when utilized in rotomolding applications, may provide a balance of improved stiffness and ESCR properties. Additionally, embodiments of the presently-described polyethylene compositions may provide such balance of stiffness and ESCR properties even at reduced thicknesses (downgauging).

As used herein, the presently-disclosed polyethylene compositions may be formed from the polymerization of ethylene and a comonomers such as a $C_3$-$C_{12}$ alkene. Contemplated comonomers include $C_6$-$C_9$ alkenes, such as 1-octene and 1-hexene. In one or more embodiments the comonomers is 1-octene. In one or more embodiments the comonomers is 1-hexene.

In one or more embodiments, the polyethylene composition may have a density of from 0.935 g/cm$^3$ to 0.955 g/cm$^3$, when measured according to ASTM D792. In embodiments, the presently disclosed polyethylene compositions may a density from 0.935 g/cm$^3$ to 0.950 g/cm$^3$, from 0.935 g/cm$^3$ to 0.945 g/cm$^3$, from 0.935 g/cm$^3$ to 0.940 g/cm$^3$, from 0.940 g/cm$^3$ to 0.955 g/cm$^3$, from 0.940 g/cm$^3$ to 0.950 g/cm$^3$, from 0.940 g/cm$^3$ to 0.945 g/cm$^3$, from 0.945 g/cm$^3$ to 0.955 g/cm$^3$, from 0.945 g/cm$^3$ to 0.950 g/cm$^3$, from 0.950 g/cm$^3$ to 0.955 g/cm$^3$, or any combination of these ranges, when measured according to ASTM D792.

In one or more embodiments, the polyethylene composition may have a melt index ($I_2$) of from 1.0 g/10 minutes (g/10 min) to 10.0 g/10 min, when measured according to ASTM D-1238 at 190° C. and 2.16 kg. In embodiments, the polyethylene composition may have a melt index ($I_2$) of from 1.0 g/10 min to 8.0 g/10 min, from 1.0 g/10 min to 6.0 g/10 min, from 1.0 g/10 min to 4.0 g/10 min, from 1.0 g/10 min to 2.0 g/10 min, from 2.0 g/10 min to 10.0 g/10 min, from 2.0 g/10 min to 8.0 g/10 min, from 2.0 g/10 min to 6.0 g/10 min, from 2.0 g/10 min to 4.0 g/10 min, from 4.0 g/10 min to 10.0 g/10 min, from 4.0 g/10 min to 8.0 g/10 min, from 4.0 g/10 min to 6.0 g/10 min, from 6.0 g/10 min to 10.0 g/10 min, from 6.0 g/10 min to 8.0 g/10 min, from 8.0 g/10 min to 10.0 g/10 min, or any combination of these ranges, when measured according to ASTM D-1238 at 190° C. and 2.16 kg.

In one or more embodiments, the polyethylene composition may include a melt index ratio ($110/I_2$) of from 5.5 to 9.5, from 5.5 to 9.0, from 5.5 to 8.5, from 5.5 to 8.0, from 5.5 to 7.5, from 5.5 to 7.0, from 5.5 to 6.5, from 5.5 to 6.0, from 6.0 to 9.5, from 6.0 to 9.0, from 6.0 to 8.5, from 6.0 to 8.0, from 6.0 to 7.5, from 6.0 to 7.0, from 6.0 to 6.5, from 6.5 to 9.5, from 6.5 to 9.0, from 6.5 to 8.5, from 6.5 to 8.0, from 6.5 to 7.5, from 6.5 to 7.0, from 7.0 to 9.5, from 7.5 to 9.0, from 7.0 to 8.5, from 7.0 to 8.0, from 7.0 to 7.5, from 7.5 to 9.5, from 7.5 to 9.0, from 7.5 to 8.5, from 7.5 to 8.0, from 8.0 to 9.5, from 8.0 to 9.0, from 8.0 to 8.5, from 8.5 to 9.5, from 8.5 to 9.0, from 9.0 to 9.5, or any combination of these ranges.

According to one or more embodiments, the polyethylene composition may have a zero shear viscosity ratio of less than 2.0. In embodiments, the polyethylene composition may have a zero shear viscosity ratio of from 1.0 to 2.0, from 1.0 to 1.8, from 1.0 to 1.6, from 1.0 to 1.4, from 1.0 to 1.2, from 1.2 to 2.0, from 1.2 to 1.8, from 1.2 to 1.6, from 1.2 to 1.4, from 1.4 to 2.0, from 1.4 to 1.8, from 1.4 to 1.6, from 1.6 to 2.0, from 1.6 to 1.8, from 1.8 to 3.0, from 1.8 to 2.8, from 1.8 to 2.6, from 1.8 to 2.0, or any combination of these ranges.

In embodiments, the polyethylene composition may have a z-average molecular weight ($Mz_{(GPC)}$) of from 150,000 g/mol to 400,000 g/mol when measured by conventional GPC techniques as described herein. According to one or more embodiments, the polyethylene composition may have a $Mz_{(GPC)}$ of from 150,000 g/mol to 350,000 g/mol, from 150,000 g/mol to 300,000 g/mol, from 150,000 g/mol to 250,000 g/mol, from 150,000 g/mol to 200,000 g/mol, from 200,000 g/mol to 400,000 g/mol, from 200,000 g/mol to 350,000 g/mol, from 200,000 g/mol to 300,000 g/mol, from 200,000 g/mol to 250,000 g/mol, from 250,000 g/mol to 400,000 g/mol, from 250,000 g/mol to 350,000 g/mol, from 250,000 g/mol to 300,000 g/mol, from 300,000 g/mol to 400,000 g/mol, from 300,000 g/mol to 350,000 g/mol, from 350,000 g/mol to 400,000 g/mol, or any combination of these ranges, when measured by conventional GPC techniques as described herein.

In embodiments, the polyethylene composition may have a number average molecular weight ($Mn_{(GPC)}$), as determined by conv. GPC, in the range from 10,000 to 50,000 g/mole. For example, the number average molecular weight can be from a lower limit of 10,000, 20,000, or 25,000 g/mole, to an upper limit of 35,000, 40,000, 45,000, or 50,000 g/mole.

In embodiments, the polyethylene composition may have a weight average molecular weight ($Mw_{(GPC)}$), as determined by conventional GPC, in the range from 60,000 to 200,000 g/mol. For example, the number average molecular weight can be from 60,000 g/mol to 180,000 g/mol, from 60,000 g/mol to 160,000 g/mol, from 60,000 g/mol to 140,000 g/mol, from 60,000 g/mol to 120,000 g/mol, from 60,000 g/mol to 100,000 g/mol, from 60,000 g/mol to 80,000 g/mol, from 60,000 g/mol to 70,000 g/mol, from 70,000 g/mol to 180,000 g/mol, from 70,000 g/mol to 160,000 g/mol, from 70,000 g/mol to 140,000 g/mol, from 70,000 g/mol to 120,000 g/mol, from 70,000 g/mol to 100,000 g/mol, from 70,000 g/mol to 80,000 g/mol, from 80,000 g/mol to 200,000 g/mol, from 80,000 g/mol to 180,000 g/mol, from 80,000 g/mol to 160,000 g/mol, from 80,000 g/mol to 140,000 g/mol, from 80,000 g/mol to 120,000 g/mol, from 80,000 g/mol to 100,000 g/mol, from 100,000 g/mol to 200,000 g/mol, from 100,000 g/mol to 180,000 g/mol, from 100,000 g/mol to 160,000 g/mol, from 100,000 g/mol to 140,000 g/mol, from 100,000 g/mol to 120,000 g/mol, from 120,000 g/mol to 200,000 g/mol, from 120,000 g/mol to 180,000 g/mol, from 120,000 g/mol to 160,000 g/mol, from 120,000 g/mol to 140,000 g/mol, from 140,000 g/mol to 200,000 g/mol, from 140,000 g/mol to 180,000 g/mol, from 140,000 g/mol to 160,000 g/mol, from 160,000 g/mol to 200,000 g/mol, from 160,000 g/mol to 180,000 g/mol, from 180,000 g/mol to 200,000 g/mol, or any combination of these ranges, when measured by conventional GPC techniques as described herein, According to embodiments, the polyethylene composition may have a molecular weight distribution, expressed as the ratio of the weight average molecular weight to number average molecular weight ($Mw_{(GPC)}/Mn_{(GPC)}$), as determined by conventional GPC, in the range of from 2.0 to 4.5. In embodiments, the polyethylene composition may have a molecular weight distribution of from 2.0 to 4.0, from 2.0 to 3.5, from 2.0 to 3.0, from 2.0 to 2.5, from 2.5 to 4.5, from 2.5 to 4.0, from 2.5 to 3.5, from 2.5 to 3.0, from 3.0 to 4.5, from 3.0 to 4.0, from 3.0 to 3.5, from 3.5 to 4.5, from 3.5 to 4.0, from 4.0 to 4.5, or any combination of these ranges. As presently described, the molecular weight distribution may be calculated according to conventional GPC techniques as described herein.

In embodiments, the polyethylene composition may have a ratio of the z-average molecular weight to the weight average molecular weight ($Mz_{(GPC)}/Mw_{(GPC)}$) of from 1.8 to 3.5 when measured by conventional GPC techniques as described here. According to one or more embodiments, the polyethylene composition may have a ratio of the z-average molecular weight to the weight average molecular weight ($Mz_{(GPC)}/Mw_{(GPC)}$) of from 1.8 to 3.5, from 1.8 to 3.0, from 1.8 to 2.5, from 1.8 to 2.0, from 2.0 to 3.5, from 2.0 to 3.0, from 2.0 to 2.5, from 2.5 to 3.5, from 2.5 to 3.0, or from 3.0 to 3.5 when measured by light-scattering GPC techniques as described herein.

As described herein, a polyethylene "fraction" refers to a portion of the total composition of the multimodal polyethylene composition. The presently-disclosed embodiments include at least a "first polyethylene fraction" and a "second polyethylene fraction." The various fractions included in the polyethylene composition may be quantified by their temperature range in an elution profile via improved comonomers composition distribution (iCCD) analysis method. Unless specified, any elution profile referred to herein is the elution profile observed via iCCD. Examples of such fractions will be better understood in view of the examples provided herewith. In general, the first fraction may include a peak in the temperature range of the first fraction and the second fraction may include a peak in the temperature range of the second fraction. The polyethylene compositions described herein may be referred to as "multimodal," meaning that they include at least two peaks in their elution profile.

In reference to the described iCCD distribution, FIG. 1 schematically depicts a sample iCCD distribution 100. FIG. 1 depicts, generally, several features of the iCCD profiles of the presently described polyethylene compositions, such as the first fraction, the second fraction, the half peak widths, etc., which are discussed in detail herein. As such, FIG. 1 can be used as a reference with respect to the disclosures related the iCCD profile provided herein. Specifically, the first fraction 102 and second fraction 106 are depicted. The first fraction 102 has a peak 104 and the second fraction 106 has a peak 108. Each fraction has a half peak width 110 and 112. It should be understood that the profile of FIG. 1 is supplied for informational purposes of describing the particular features of the iCCD elution profile of an exemplary embodiment of the polyethylene composition described herein.

In one or more embodiments, the polyethylene composition may have a first polyethylene fraction area defined by an area in the elution profile via improved comonomer composition distribution (iCCD) analysis method in a temperature range of 70° C. to 97° C. The first polyethylene area fraction may correspond with the total relative mass of the polymer fraction in the polyethylene composition, which may be referred to herein as the "first mass fraction."

In embodiments, the first polyethylene fraction may have at least one peak in a temperature range of 70° C. and 97° C. in an elution profile via iCCD. In some embodiments, the first polyethylene fraction area may encompass the area in the elution profile beneath the peak in the temperature range of 70° C. and 97° C. in the elution profile via iCCD. In further embodiments, the first polyethylene fraction may have a single peak in a temperature range of 70° C. and 97° C. in an elution profile via iCCD. As used herein, a "single peak" refers to an iCCD wherein a particular fraction include only one peak. That is, in some embodiments, the iCCD of the first polyethylene fraction includes only an upward sloping region followed by a downward sloping region to form the single peak. In one or more embodiments, the single peak of the first polyethylene fraction may be in a temperature range of from 70° C. and 97° C., such as from 70° C. and 95° C. and from 70° C. and 93° C.

It should be understood that a peak in the first polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the first polyethylene fraction area may comprise less than 60% of the total area of the elution profile (for example, less than 55% or less than 50% of the total area of the elution profile). For example, the first polyethylene fraction area may comprise from 1% to 60% of the total area of the elution profile, such as from 1% to 55%, from 1% to 50%, from 1% to 45%, from 1% to 40%, from 1% to 35%, from 1% to 30%, from 1% to 25%, from 1% to 20%, from 1% to 15%, from 1% to 10%, from 1% to 5%, from 5% to 60%, from 5% to 55%, from 5% to 50%, from 5% to 45%, from 5% to 40%, from 5% to 35%, from 5% to 30%, from 5% to 25%, from 5% to 20%, from 5% to 15%, from 5% to 10%, from 10% to 60%, from 10% to 55%, from 10% to 50%, from 10% to 45%, from 10% to 40%, from 10% to 35%, from 10% to 30%, from 10% to 25%, from 10% to 20%, from 10% to 15%, from 15% to 60%, from 15% to 55%, from 15% to 50%, from 15% to 45%, from 15% to 40%, from 15% to 35%, from 15% to 30%, from 15% to 25%, from 15% to 20%, from 20% to 60%, from 20% to 55%, from 20% to 50%, from 20% to 45%, from 20% to 40%, from 20% to 35%, from 20% to 30%, from 20% to 25%, from 25% to 60%, from 25% to 55%, from 25% to 50%, from 25% to 45%, from 25% to 40%, from 25% to 35%, from 25% to 30%, from 30% to 60%, from 30% to 55%, from 30% to 50%, from 30% to 45%, from 30% to 40%, from 40% to 60%, from 40% to 55%, from 40% to 50%, from 50% to 60%, or any combination of these ranges, of the total area of the elution profile.

In one or more embodiments, the first polymer fraction in the temperature range of from 70° C. to 97° C. may correspond with a first fraction molecular weight ($Mw_{(iCCD, 70° C.-97° C.)}$) calculated via iCCD analysis as described subsequently in this disclosure. In embodiments, the first fraction molecular weight ($Mw_{(iCCD, 70° C.-97° C.)}$) may be from 80,000 g/mol to 180,000 g/mol, from 80,000 g/mol to 160,000 g/mol, from 80,000 g/mol to 140,000 g/mol, from 80,000 g/mol to 120,000 g/mol, from 80,000 g/mol to 100,000 g/mol, from 100,000 g/mol to 180,000 g/mol, from 100,000 g/mol to 160,000 g/mol, from 100,000 g/mol to 140,000 g/mol, from 100,000 g/mol to 120,000 g/mol, from 120,000 g/mol to 180,000 g/mol, from 120,000 g/mol to 160,000 g/mol, from 120,000 g/mol to 140,000 g/mol, from 140,000 g/mol to 180,000 g/mol, from 140,000 g/mol to 160,000 g/mol, from 160,000 g/mol to 180,000 g/mol, or any combination of these ranges. weight."

In one or more embodiments, the polyethylene composition may have a second polyethylene fraction area in the temperature range from 97° C. to 110° C. of an elution profile via improved comonomer composition distribution (iCCD) analysis method. As used herein, the second polyethylene fraction area may be defined as the area in the elution profile beneath the second polyethylene fraction between 97° C. and 110° C. The second polyethylene area fraction may correspond with the total relative mass of the polymer fraction in the polyethylene composition, referred to herein as the "second mass fraction."

In one or more embodiments, the second polyethylene fraction may have a single peak in the temperature range of 97° C. to 110° C. in the elution profile via iCCD. It should be understood that a peak in the second polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction. The temperature range of the second polyethylene fraction of 97° C. to 110° C. may be desirable because the low molecular weight, high density component at 97° C. to 110° C. may allow the polyethylene to achieve higher overall density while maintaining a lower density fraction.

According to one or more embodiments, the second polyethylene fraction area may comprise greater than or equal to 30% of the total area of the elution profile (for example, greater than or equal to 40%, greater than or equal to 50%, greater than or equal to 60%, or greater than or equal to 70% of the total area of the elution profile). For example, the second polyethylene fraction area may comprise from 30% to 80%, from 30% to 70%, from 30% to 60%, from 30% to 50%, from 30% to 40%, from 40% to 80%, from 40% to 70%, from 40% to 60%, from 40% to 50%, from 50% to 80%, from 50% to 70%, from 50% to 60%, from 60% to 80%, from 60% to 70%, or from 70% to 80%, of the total area of the elution profile.

According to some embodiments, a ratio of the molecular weight of the overall polyethylene composition ($Mw_{(iCCD)}$) to the first fraction molecular weight ($Mw_{(iCCD, 70° C.-97° C.)}$) may be less than 0.90 (for example, less than 0.88, less than 0.86, less than 0.84, less than 0.82, less than 0.80). For example, the ratio of the molecular weight of the overall polyethylene composition to first fraction molecular weight may be from 0.80 to 0.90, from 0.80 to 0.88, from 0.80 to 0.86, from 0.80 to 0.84, from 0.80 to 0.82, from 0.82 to 0.90, from 0.82 to 0.88, from 0.82 to 0.86, from 0.82 to 0.84, from 0.84 to 0.90, from 0.84 to 0.88, from 0.84 to 0.86, from 0.86 to 0.90, from 0.86 to 0.88, or from 0.88 to 0.90. Without being bound by theory, it is believed that having a ratio less than 0.9 means that the low density component (the first fraction from 70° C. to 97° C.) has a higher molecular weight than the average molecular weight of the overall polyethylene composition. Accordingly, the low density component having the higher molecular weight may promotes tie chain formation in the polymer matrix of the polyethylene composition, which may be beneficial for ESCR and toughness properties.

According to some embodiments, a ratio of the first mass fraction to the second mass fraction may be less than 2.0 (for example, less than 1.8, less than 1.6, less than 1.4, less than 1.2, or less than 1.0). For example, the ratio of the first mass fraction to the second mass fraction may be from 0.6 to 2.0, from 0.6 to 1.8, from 0.6 to 1.6, from 0.6 to 1.4, from 0.6 to 1.2, from 0.6 to 1.0, from 0.6 to 0.8, from 0.8 to 2.0, from 0.8 to 1.8, from 0.8 to 1.6, from 0.8 to 1.4, from 0.8 to 1.2, from 0.8 to 1.0, from 1.0 to 2.0, from 1.0 to 1.8, from 1.0 to 1.6, from 1.0 to 1.4, from 1.0 to 1.2, from 1.2 to 2.0, from 1.2 to 1.8, from 1.2 to 1.6, from 1.2 to 1.4, from 1.4 to 2.0, from 1.4 to 1.8, from 1.4 to 1.6, from 1.6 to 2.0, from 1.6 to 1.8, or from 1.8 to 2.0. Without being bound by theory, having lower values for this ratio would mean that there is less of the low density, high molecular weight component (the first fraction from 70° C. to 97° C.), but the overall polyethylene composition may still exhibit improved properties, such as ESCR and toughness. Having more of the high density, low molecular weight component (the second fraction from 97° C. to 110° C.) may allow for the polyethylene composition to have sufficient stiffness while providing for improved flow of the product. As described subsequently in this disclosure, improved flow is beneficial for various article fabrication methods and may allow for more complex article designs.

Embodiments of the polyethylene compositions described herein may further be characterized by a comonomer distribution breadth index 50 (CDBI50) of less than or equal to 50% (such as less than or equal to 40%, less than or equal to 30%, and less than or equal to 40%). As used herein, CDBI50 is defined as the weight percent of the polymer molecules having a comonomer content within 50 percent of the median total molar comonomer content. It represents a comparison of the comonomer distribution in the polymer to the comonomer distribution expected for a Bernoullian distribution. In further embodiments, the polyethylene composition may have a CDBI50 of from 10% to 50%, from 10% to 40%, from 10% to 30%, from 10% to 20%, from 20% to 50%, from 20% to 40%, from 20% to 30%, from 30% to 50%, from 30% to 40%, or from 40% to 50%. Without being bound by theory, having a CDBI50 of less than 50% represents a broader comonomer distribution and reflect a wide density split that is not achievable by some conventional polyethylene compositions. The wide density split may promote a high level of tie chain formation from the low density, high molecular weight fraction, which contributes to the overall ESCR and toughness properties. Moreover, the wide density split may contribute to the stiffness properties needed that may allow for downgauging of products.

Polymerization of the Polyethylene Composition

Any conventional polymerization processes may be employed to produce the polyethylene compositions in the presence of the catalyst systems of this disclosure. Such conventional polymerization processes include, but are not limited to, solution polymerization processes, gas phase polymerization processes, slurry phase polymerization processes, and combinations thereof using one or more conventional reactors such as loop reactors, isothermal reactors, adiabatic reactors, fluidized bed gas phase reactors, stirred tank reactors, batch reactors in parallel, series, or any combinations thereof, for example.

The polyethylene compositions may, for example, be produced via solution phase polymerization processes, using one or more loop reactors, adiabatic reactors, and combinations thereof. In general, the solution phase polymerization process may occurs in one or more well mixed reactors, such as one or more loop reactors and/or one or more adiabatic reactors at a temperature in the range from 115° C. to 250° C.; for example, from 135° C. to 200° C., and at pressures in the range of from 300 psig to 1000 psig, for example, from 450 psig to 750 psig.

In one embodiment, the polyethylene composition may be produced in two loop reactors in series configuration, where the first reactor temperature is in the range from 115° C. to 200° C., for example, from 135° C. to 165° C., and the second reactor temperature is in the range from 150° C. to 210° C., for example, from 185° C. to 200° C. In another embodiment, the polyethylene composition may be produced in a single reactor, the reactor temperature is in the range from 115° C. to 200° C., for example from 130° C. to 190° C. The residence time in a solution phase polymerization process is typically in the range from 2 minutes to 40 minutes, for example from 5 minutes to 20 minutes. Ethylene, solvent, one or more catalyst systems, optionally one or more cocatalysts, and optionally one or more comonomers, are fed continuously to one or more reactors. Exemplary solvents include, but are not limited to, isoparaffins. For example, such solvents are commercially available under the name ISOPAR E from ExxonMobil Chemical. The resultant mixture of the polyethylene composition and solvent is then removed from the reactor or reactors, and the polyethylene composition is isolated. Solvent is typically recovered via a solvent recovery unit, i.e., heat exchangers and separator vessel, and the solvent is then recycled back into the polymerization system.

In one embodiment, the polyethylene composition may be produced, via a solution polymerization process, in a dual reactor system, for example a dual loop reactor system, wherein ethylene, and optionally one or more α-olefins, are polymerized in the presence of one or more catalyst systems, in one reactor, to produce a first ethylene-based polymer, and ethylene, and optionally one or more α-olefins, are polymerized in the presence of one or more catalyst systems, in a second reactor, to produce a second ethylene-based polymer. Additionally, one or more cocatalysts may be present. In another embodiment, the polyethylene composition may be produced via a solution polymerization process, in a single reactor system, for example, a single loop reactor system, wherein ethylene, and optionally one or more α-olefins, are polymerized in the presence of one or more catalyst systems. Additionally, one or more cocatalysts may be present.

Catalyst Systems

Specific embodiments of catalyst systems that can, in one or more embodiments, be used to produce the polyethylene compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl (—$C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$, in which "$C^*$" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1\text{-}C_{18})$ alkylene, examples of substituted $(C_1\text{-}C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo [2.2.2] octane.

The term "$(C_3\text{-}C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$, each $R^N$, and each $R^P$ is unsubstituted $(C_1\text{-}C_{18})$hydrocarbyl or —H. The term "heterohydrocarbon" refers to a molecule or molecular framework in which one or more carbon atoms are replaced with a heteroatom. The term "$(C_1\text{-}C_{40})$heterohydrocarbyl" means a heterohydrocarbon radical of from 1 to 40 carbon atoms and the term "$(C_1\text{-}C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1\text{-}C_{50})$heterohydrocarbyl and $(C_1\text{-}C_{50})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1\text{-}C_{40})$heterohydrocarbyl may be unsubstituted or substituted $(C_1\text{-}C_{40})$heteroalkyl, $(C_1\text{-}C_{40})$hydrocarbyl-O—, $(C_1\text{-}C_{40})$hydrocarbyl-S—, $(C_1\text{-}C_{40})$hydrocarbyl-S(O)—, $(C_1\text{-}C_{40})$hydrocarbyl-S(O)$_2$—, $(C_1\text{-}C_{40})$hydrocarbyl-Si($R^C$)$_2$—, $(C_1\text{-}C_{40})$hydrocarbyl-N($R^N$)—, $(C_1\text{-}C_{40})$hydrocarbyl-P($R^P$)—, $(C_2\text{-}C_{40})$heterocycloalkyl, $(C_2\text{-}C_{19})$heterocycloalkyl-$(C_1\text{-}C_{20})$alkylene, $(C_3\text{-}C_{20})$cycloalkyl-$(C_1\text{-}C_{19})$heteroalkylene, $(C_2\text{-}C_{19})$heterocycloalkyl-$(C_1\text{-}C_{20})$heteroalkylene, $(C_1\text{-}C_{40})$heteroaryl, $(C_1\text{-}C_{19})$heteroaryl-$(C_1\text{-}C_{20})$alkylene, $(C_6\text{-}C_{20})$aryl-$(C_1\text{-}C_{19})$heteroalkylene, or $(C_1\text{-}C_{19})$heteroaryl-$(C_1\text{-}C_{20})$heteroalkylene.

The term "$(C_4\text{-}C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x\text{-}C_y)$heteroaryl generally, such as $(C_4\text{-}C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1\text{-}C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include Si($R^C$)$_3$, Ge($R^C$)$_3$, Si($R^C$)$_2$, Ge($R^C$)$_2$, P($R^P$)$_2$, P($R^P$), N($R^N$)$_2$, N($R^N$), N, O, O$R^C$, S, S$R^C$, S(O), and S(O)$_2$, wherein each of the heteroalkyl and heteroalkylene groups are unsubstituted or substituted by one or more $R^S$.

Examples of unsubstituted $(C_2\text{-}C_{40})$heterocycloalkyl are unsubstituted $(C_2\text{-}C_{20})$heterocycloalkyl, unsubstituted $(C_2\text{-}C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F$^-$), chloride (Cl$^-$), bromide (Br$^-$), or iodide (I$^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing a polyethylene composition includes a metal-ligand complex according to formula (I):

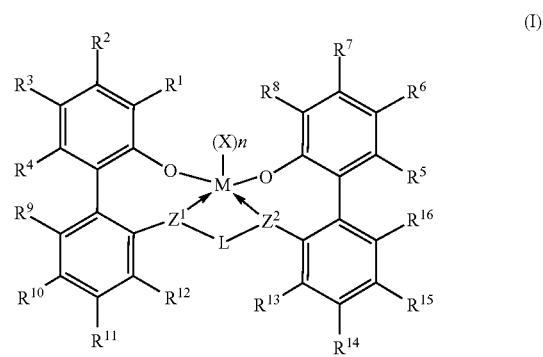

(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; L is $(C_1\text{-}C_{40})$hydrocarbylene or $(C_1\text{-}C_{40})$heterohydrocarbylene, wherein the $(C_1\text{-}C_{40})$hydrocarbylene has a portion that comprises a 1-carbon atom to 10-carbon atom linker backbone linking the two Z groups in Formula (I) (to which L is bonded) or the $(C_1\text{-}C_{40})$heterohydrocarbylene has a portion that comprises a 1-atom to 10-atom linker backbone linking the two Z groups in Formula (I), wherein each of the 1 to 10 atoms of the 1-atom to 10-atom linker backbone of the $(C_1\text{-}C_{40})$heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is $(C_1\text{-}C_{30})$hydrocarbyl or $(C_1\text{-}C_{30})$heterohydrocarbyl; $R^1$ and $R^8$ are independently selected from the group consisting of —H, $(C_1\text{-}C_{40})$hydrocarbyl, $(C_1\text{-}C_{40})$heterohydrocarbyl, —Si($R^C$)$_3$, —Ge($R^C$)$_3$, P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

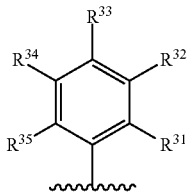

(II)

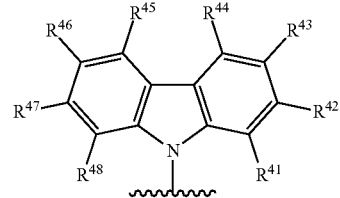

(III)

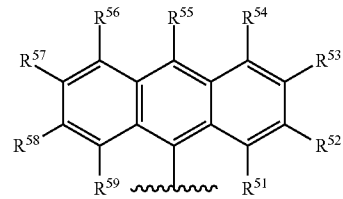

(IV)

In formulas (II), (III), and (IV), each of $R^{31\text{-}35}$, $R^{41\text{-}48}$, or $R^{51\text{-}59}$ is independently chosen from $(C_1\text{-}C_{40})$hydrocarbyl, $(C_1\text{-}C_{40})$heterohydrocarbyl, —Si($R^C$)$_3$, —Ge($R^C$)$_3$, —P($R^P$)$_2$, —N($R^N$)$_2$, —N=CH$R^C$, O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV).

In formula (I), each of $R^{2\text{-}4}$, $R^{5\text{-}7}$, and $R^{9\text{-}16}$ is independently selected from $(C_1\text{-}C_{40})$hydrocarbyl, $(C_1\text{-}C_{40})$heterohydrocarbyl, —Si($R^C$)$_3$, —Ge($R^C$)$_3$, —P($R^P$)$_2$, —N($R^N$)$_2$, —N=CH$R^C$, O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and —H.

In some embodiments, the polyethylene composition is formed using a first catalyst according to formula (I) in a first reactor and a different catalyst according to formula (I) in a second reactor.

In one exemplary embodiment where a dual loop reactor is used, the procatalyst used in the first loop is zirconium, [[2,2'''-[[bis[1-methylethyl)germylene]bis(methyleneoxy-κO)]bis[3'',5,5''-tris(1,1-dimethylethyl)-5'-octyl[1,1':3',1'''-terphenyl]-2'-olato-κO]](2-)]dimethyl-, having the chemical formula $C_{86}H_{128}F_2GeO_4Zr$ and the following structure (V):

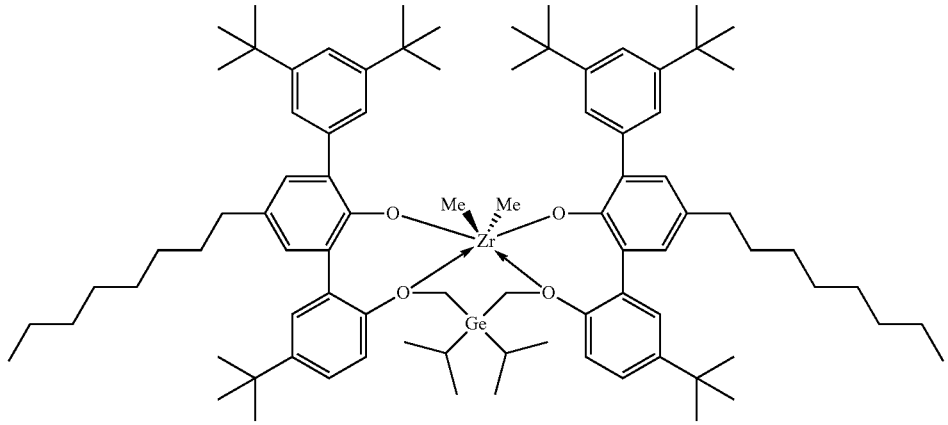

(V)

In such an embodiment, the procatalyst used in the second loop is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1']-biphenyl]-2-olato-κO]](2-)]dimethyl, having the chemical formula $C_{107}H_{154}N_2O_4Si_2Zr$ and the following structure (VI):

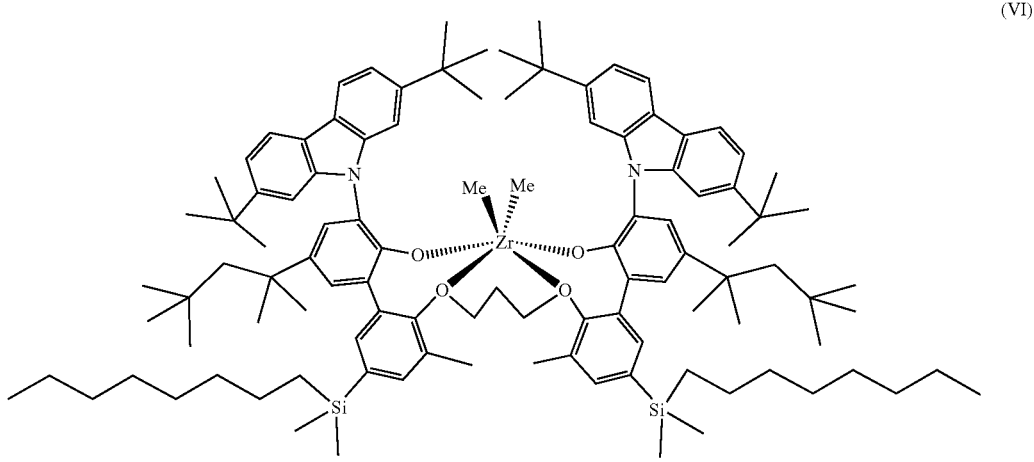

(VI)

(pentafluorophenyl)borane). As used herein, the term "ammonium" means a nitrogen cation that is a $((C_1-C_{20})\text{hydrocarbyl})_4N^+$ a $((C_1-C_{20})\text{hydrocarbyl})_3N(H)^+$, a $((C_1-C_{20})\text{hydrocarbyl})_2N(H)_2^+$, $(C_1-C_{20})\text{hydrocarbylN(H)}_3^+$, or $N(H)_4^+$, wherein each $(C_1-C_{20})$hydrocarbyl, when two or more are present, may be the same or different.

Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1-C_{20})$hydrocarbyl substituents as described herein. In one embodiment, Group 13 metal compounds are $\text{tri}((C_1-C_{20})\text{hydrocarbyl})$-substituted-aluminum or $\text{tri}((C_1-C_{20})\text{hydrocarbyl})$-boron compounds. In embodiments, Group 13 metal compounds are tri(hydrocarbyl)-substituted-aluminum, $\text{tri}((C_1-C_{20})\text{hydrocarbyl})$-boron compounds, $\text{tri}((C_1-C_{10})\text{alkyl})$aluminum, $\text{tri}((C_6-C_{18})\text{aryl})$boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris$((C_1-C_{20})\text{hydrocarbyl borate}$ (e.g. trityl tetrafluoroborate) or a $\text{tri}((C_1-C_{20})\text{hydrocarbyl})$ammonium tetra$((C_1-C_{20})\text{hydrocarbyl})$borane (e.g. bis(octadecyl)methylammonium tetrakis(pentafluorophenyl)borane). As used herein, the term Combinations of neutral Lewis acid activators (co-catalysts) include mixtures comprising a combination of a $\text{tri}((C_1-C_4)\text{alkyl})$aluminum and a halogenated $\text{tri}((C_6-C_{18})\text{aryl})$boron compound, especially a tris(pentafluorophenyl)borane. Embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:30, in embodiments, from 1:1:1.5 to 1:5:10

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1⁻) amine, and combinations thereof.

In some embodiments, one or more of the foregoing activating co-catalysts are used in combination with each other. An especially preferred combination is a mixture of a $\text{tri}((C_1-C_4)\text{hydrocarbyl})$aluminum, $\text{tri}((C_1-C_4)\text{hydrocarbyl})$borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some embodiments, at least 1:1000; and 10:1 or less, and in some embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Articles

Embodiments of the present disclosure also relate to articles, such as rotomolded and injection-molded articles, formed from the polyethylene compositions of the present disclosure. Such articles can be formed from any of the polyethylene compositions of the present disclosure described herein.

Rotational molding, commonly referred to as "rotomolding" or "rotocasting," is widely used for molding hollow articles. Rotomolded articles, such as storage tanks, furniture, toys, canoes and kayaks, and playground slides, may be used in a variety of applications and industries. In particular, rotomolding methods allow materials to be molded into complex shapes, completely filling corners and narrow sections. Generally, rotomolding methods include depositing a polymeric resin inside a mold, heating the filled mold to melt the polymeric resin, rotating the mold to adhere the melted resin to the inside of the mold, cooling the mold, and removing a formed article from the mold. One-piece hollow articles can be made via rotomolding. Examples of roto-molded articles include but are not limited to toys, furniture, containers, for example tanks and watering cans, and sporting goods, for example canoes and kayaks.

Polymer molding applications, including rotomolding applications and injection-molding applications, are continually looking for solutions to allow for the reduction of material costs, for example, from down-gauging (i.e., using thinner wall thicknesses), or by reducing or eliminating relatively expensive materials. Conventionally, down-gauging may be accomplished using polymeric resins with higher densities; however, increasing density usually results in decreased environmental stress crack resistance (ESCR). Accordingly, there are needs for polyethylene compositions, which may be utilized in rotomolding applications that exhibit a balance of stiffness and ESCR properties that meet customer and industry requirements.

Embodiments of the present disclosure may provide a polyethylene composition comprising a broad comonomer distribution such that when utilized in rotomolding applications, the polyethylene composition may exhibit desirable stiffness without compromising ESCR or impact properties. As such, embodiments of the present disclosure may provide a polyethylene composition that, when utilized in rotomolding applications, provides a balance of stiffness and ESCR properties, which may allow for reduced material costs. Furthermore, the polyethylene compositions described herein may exhibit flow and processability properties that allow for relatively easier fabrication methods and more complex article design.

In embodiments, the polyethylene compositions may be blended with one or more polyolefins to produce a blend, which may be rotomolded into the article. In embodiments, the blend may include a blend of the polyethylene composition described herein and one or more of a linear low density polyethylene (LLDPE), a low density polyethylene (LDPE), a medium density polyethylene (MDPE), a high density polyethylene (HDPE). In embodiments, providing a polyethylene composition including the polyethylene composition described herein or a blend comprising the polyethylene composition described herein, when utilized in rotomolding applications, may provide a balance of stiffness and ESCR properties.

It should be understood that the polyethylene composition or blend comprising the polyethylene composition described herein may further comprise one or more additives as known to those of skill in the art such as, for example, plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, hindered amine light stabilizers (HALS), or combinations of two or more thereof. Inorganic fillers, such as calcium carbonate, and the like can also be incorporated into the polyethylene composition. In some embodiments, the polyethylene composition may include up to 5 weight percent of such additional additives based on the total weight of the polyethylene composition. In embodiments, the total amount of additives in the polyethylene composition can be from 0.2 wt. % to 5 wt. %, from 0.2 wt. % to 4 wt. %, from 0.2 wt. % to 3 wt. %, from 0.2 wt. % to 2 wt. %, from 0.2 wt. % to 1 wt. %, from 0.2 wt. % to 5 wt. %, from 0.5 wt. % to 5 wt. %, from 0.5 wt. % to 4 wt. %, from 0.5 wt. % to 3 wt. %, from 0.5 wt. % to 2 wt. %, from 0.5 wt. % to 1 wt. %, from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % based on the total weight of the polyethylene composition. The incorporation of the additives can be carried out by any known process such as, for example, by dry blending, by extruding a mixture of the various constituents, by the conventional master batch technique, or the like.

Various methods of producing embodiments of articles, such as rotomolded articles, from the polyethylene compositions disclosed herein would be familiar to one of ordinary skill in the art. Various methodologies are contemplated for producing embodiments of the rotomolded articles.

Test Methods

The test methods include the following:

Melt Index

Melt indices $I_2$ (or I2) and $I_{10}$ (or I10) of polymer samples were measured in accordance to ASTM D-1238 (method B) at 190° C. and at 2.16 kg and 10 kg load, respectively. Their values are reported in g/10 min. Fractions of polymer samples may be measured by collecting product polymer from the reactor that produces that specific fraction or portion of the polymer composition. For example, the first polyethylene fraction can be collected from the reactor producing the lower density, higher molecular weight component of the polymer composition. The polymer solution is dried under vacuum before the melt index measurement.

Density

Samples for density measurement were prepared according to ASTM D4703. Measurements were made, according to ASTM D792, Method B, within one hour of sample pressing.

Creep Zero Shear Viscosity Measurement Method

Zero-shear viscosities are obtained via creep tests that were conducted on an AR-G2 stress controlled rheometer (TA Instruments; New Castle, Del) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ\ 1)$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 $Mw_{(GPC)}$.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{PeakMax})}{\text{Peak Width at } \frac{1}{2} \text{ height}} \right)^2 \quad (EQ\ 2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ\ 3)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad (EQ\ 4)$$

$$Mw_{(GPC)} = \frac{\sum_i (IR_i * M_{polyethylene_i})}{\sum_i IR_i} \quad (EQ\ 5)$$

$$M_{Z(GPC)} = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

Flowrate(effective)=Flowrate(nominal)*(RV(FM Calibrated)/RV(FM Sample)) (EQ 7)

Improved Method for Comonomer Content Analysis (iCCD)

Improved method for comonomer content analysis (iCCD) was developed in 2015 (Cong and Parrott et al., WO2017040127A1). iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). Dried silica was packed into three emptied HT-GPC columns to further purify ODCB as eluent. The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 300 μl. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $Mw_{(GPC)}/Mn_{(GPC)}$ approximately 2.6 by conventional gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures were linearly fit to the linear equation y=−6.3515x.+101.00, where y represented elution temperature of iCCD and x represented the octene mole %, and $R^2$ was 0.978.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight ($Mw_{(iCCD)}$) from iCCD includes the following four steps:

(1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.

(2) Each LS datapoint in LS chromatogram is shifted to correct for the interdetector offset before integration.

(3) Baseline subtracted LS and concentration chromatograms are integrated for the whole eluting temperature range of the Step (1). The MW detector constant is calculated by using a known MW HDPE sample in the range of 100,000 to 140,000 Mw and the area ratio of the LS and concentration integrated signals.

(4) Mw of the polymer was calculated by using the ratio of integrated light scattering detector (90 degree angle) to the concentration detector and using the MW detector constant.

Calculation of half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C.

Zero-Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight ($Mw_{(GPC)}$) according to the following Equations (EQ) 8 and 9:

$$ZSVR = \frac{\eta_{0B}}{\eta_{0L}} \quad (EQ\ 8)$$

$$\eta_{0L} = 2.29 \times 10^{-15} M_{w-gpc}^{3.65} \quad (EQ\ 9)$$

The ZSV value is obtained from creep test at 190° C. via the method described above. The $Mw_{(GPC)}$ value is determined by the conventional GPC method (Equation 5 in the Conventional GPC method description). The correlation between ZSV of linear polyethylene and its $Mw_{(GPC)}$ was established based on a series of linear polyethylene reference materials. A description for the ZSV-$Mw_{(GPC)}$ relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference—Society of Plastics Engineers (2008), 66th 887-891.

Dynamic Rheological Analysis

To characterize the rheological behavior of substantially linear ethylene polymers, S Lai and G. W. Knight introduced (ANTEC '93 Proceedings, Insite™ Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (ANTEC '94, Dow Rheology Index (DRI) for Insite™ Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI=[3650000\times(\tau_0/\eta_0)-1]/10 \quad (EQ\ 10)$$

wherein $\tau_0$ is the characteristic relaxation time of the material and is the zero shear rate complex viscosity of the material. The DRI is calculated by least squares fit of the rheological curve (dynamic complex viscosity $\eta^*(\omega)$ versus applied frequency ($\omega$) e.g., 0.01-100 rads/s) as described in U.S. Pat. No. 6,114,486 with the following generalized Cross equation, i.e.

$$\eta^*(\omega)=\eta_0/[1+(\omega\cdot\tau_0)^n] \quad (EQ\ 11)$$

wherein n is the power law index of the material, $\eta^*(\omega)$ and $\omega$ are the measured complex viscosity and applied frequency data respectively.

Dynamic rheological measurements are carried out, according to ASTM D4440, on a dynamic rheometer (e.g., ARES rheometer by TA Instruments) with 25 mm diameter parallel plates in a dynamic mode under an inert atmosphere. For all experiments, the rheometer has been thermally stable at 190° C. for at least 30 minutes before inserting the appropriately stabilized (with anti-oxidant additives), compression-moulded sample onto the parallel plates. The plates are then closed with a positive normal force registered on the meter to ensure good contact. After approximately 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for approximately 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

The values of storage (or elastic) modulus, loss (or viscous) modulus (G"), complex modulus (G*), complex viscosity ($\eta^*$) and tan $\delta$ (the ratio of loss modulus and storage modulus, G'/G') were obtained as a function of frequency ($\omega$) at a given temperature (e.g., 190° C.).

Instrumented Dart Impact

Instrumented dart impact method is measured according to ASTM D3763 on compression molded plaque specimens using an Instron CEAST 9350 impact tester. The test is conducted using 12.7 mm diameter tip with hemispherical head. The instrument is equipped with an environmental chamber for testing at low or high temperature. Typical specimen size is 100 mm×100 mm. Standard test velocity is 200 m/min. Plaque thickness is 3.0 mm. The test was performed at a temperature of −40° C.

Comonomer Distribution Breadth Index (CDBI)

The CDBI50 (Composition Distribution Breadth Index) is a parameter used to characterized resin composition distribution. It is a quantitative measure of the breath of the distribution. CDBI50 is defined as the weight percent of the copolymer molecules having a comonomer content within 50% (that is, 50% on each side) of the median total molar comonomer content (Cmed). The Cmed composition corresponds to the composition at the point where the cumulative integral equals 0.5. The difference between the values of the cumulative integral at composition 0.5 Cmed and 1.5 Cmed is the CDBI50 of the copolymer. The CDBI50 of a resin can be determine utilizing separation techniques such as iCCD, ATREF, and CEF. CDBI50 values fall between zero and one, where greater values indicate narrow comonomer distribution and low values indicating broad comonomer distribution. Along similar principle, CDBI25 is defined as the weight percent of the copolymer molecules having a comonomer content within 25% of the median total molar comonomer content (Cmed). The difference between the values of the cumulative integral at composition 0.75 Cmed and 1.25 Cmed is the CDBI25 of the copolymer.

The CDBI50 is calculated using the methodology described in WO/93/03093, which is hereby incorporated by reference, from data obtained from CEF. CDBI represents a comparison of the comonomer distribution in the polymer to the comonomer distribution expected for a Bernoullian distribution.

Environmental Stress Cracking Resistance (ESCR)

Resin ESCR was measured according to ASTM D 1693-13. The specimens were compression molded into a plaque according to the ASTM method D4703-10a (Procedure C). A die-cut was used to cut 38 mm×13 mm specimens within 24 hr after the sheets are prepared. Specimen thickness depends on the ESCR method to be run (A or B). The samples were tested using both Method A. Method A used 3.15 mm thick specimens, while Method B used 1.90 mm thick specimens.

To perform the test, a controlled imperfection (notch) was put on one surface of each specimen. The 10 specimens were bent and exposed to the action of a surface-active agent (Igepal® CO-630) at 50° C. The concentration of surfactant was 10% in water. The number of specimens that crack as a function of time was monitored. Failures were recorded and the result, F50, corresponds to the time for which 50% of specimens failed (calculated by linear regression).

EXAMPLES

The following examples illustrate features of the present disclosure but are not intended to limit the scope of the disclosure. The following experiments analyzed the performance of embodiments of the polyethylene compositions described herein.

Example 1: Preparation of Polyethylene Compositions 1-4

Polyethylene Compositions 1-4, which are described according to the one or more embodiments of the detailed description, were prepared by a method and utilizing the catalysts and reactors described below.

All raw materials (monomer and comonomer) and the process solvent (Shellsol SBP 100-140) were purified with molecular sieves before introduction into the reaction environment. Hydrogen was supplied pressurized as a high purity grade and was not further purified. The reactor monomer feed stream was pressurized via a mechanical compressor to above reaction pressure. The solvent and comonomer feed was pressurized via a pump to above reaction pressure. The individual catalyst components were manually batch diluted with purified solvent and pressured to above reaction pressure. All reaction feed flows were measured with mass flow meters and independently controlled with computer automated valve control systems.

A two reactor system was used in a series configuration. Each continuous solution polymerization reactor utilized a liquid full, non-adiabatic, isothermal, circulating, isothermal continuously stirred tank reactor (CSTR). Independent control of all fresh solvent, monomer, comonomer, hydrogen, and catalyst component feeds were possible. The total fresh feed stream to each reactor (solvent, monomer, comonomer, and hydrogen) was temperature controlled to maintain a single solution phase by passing the feed stream through a heat exchanger. The fresh feed was controlled so that each injector received half of the total fresh feed mass flow. The catalyst components were injected into the polymerization reactor through injection stingers. The catalyst feed was computer controlled to maintain each reactor monomer conversion at the specified targets. The cocatalyst components were fed based on calculated specified molar ratios to the primary catalyst component.

The effluent from the first polymerization reactor (containing solvent, monomer, comonomer, hydrogen, catalyst components, and polymer) exited the first reactor and was added to the second reactor.

The second reactor effluent entered a zone where it was deactivated with the addition of and reaction with a suitable reagent (water). At this same reactor exit location, other additives were added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent entered a devolatization system where the polymer was removed from the non-polymer stream. The isolated polymer melt was pelletized and collected. The non-polymer stream was removed from the system.

The reactor stream feed data correspond to the values in Table 1. The data are presented such that the complexity of the solvent recycle system was accounted for and the reaction system can be treated more simply as a once through flow diagram. Table 2 shows the catalysts referenced in Table 1.

TABLE 1

Polymerization Conditions of Polyethylene Compositions 1-4.

| Polyethylene Composition | | Polyethylene Composition 1 | Polyethylene Composition 2 | Polyethylene Composition 3 | Polyethylene Composition 4 |
|---|---|---|---|---|---|
| Reactor Configuration | Type | Dual Series | Dual Series | Dual Series | Dual Series |
| Comonomer type | Type | 1-octene | 1-octene | 1-octene | 1-octene |
| First Reactor Feed Solvent/ Ethylene Mass Flow Ratio | g/g | 6.3 | 6.2 | 6.4 | 6.6 |
| First Reactor Feed Comonomer/ Ethylene Mass Flow Ratio | g/g | 0.1 | 0.1 | 0.2 | 0.1 |
| First Reactor Feed Hydrogen/ Ethylene Mass Flow Ratio | g/g | 7.8E−05 | 6.5E−05 | 9.8E−05 | 9.3E−05 |

TABLE 1-continued

Polymerization Conditions of Polyethylene Compositions 1-4.

| Polyethylene Composition | | Polyethylene Composition 1 | Polyethylene Composition 2 | Polyethylene Composition 3 | Polyethylene Composition 4 |
|---|---|---|---|---|---|
| First Reactor Temperature | °C. | 160.0 | 160.0 | 160.0 | 160.0 |
| First Reactor Pressure | barg | 27.0 | 27.0 | 27.0 | 27.0 |
| First Reactor Ethylene Conversion | % | 93.5 | 92.2 | 92.2 | 90.9 |
| First Reactor Catalyst Type | Type | Catalyst Component B | Catalyst Component B | Catalyst Component B | Catalyst Component B |
| First Reactor Catalyst Metal | Type | Zr | Zr | Zr | |
| First Reactor Co-Catalyst 1 Type | Type | Co-catalyst A | Co-catalyst A | Co-catalyst A | Co-catalyst A |
| First Reactor Co-Catalyst 2 Type | Type | Co-catalyst B | Co-catalyst B | Co-catalyst B | Co-catalyst B |
| First Reactor Co-Catalyst 1 to Catalyst Molar Ratio (B to Metal ratio) | Ratio | 1.2 | 1.2 | 1.2 | 1.2 |
| First Reactor Co-Catalyst 2 to Catalyst Molar Ratio (Al to Metal ratio) | Ratio | 50.4 | 78.7 | 57.9 | 57.9 |
| First Reactor Residence Time | min | 10.9 | 13.8 | 11.9 | 11.0 |
| Second Reactor Feed Solvent/ Ethylene Mass Flow Ratio | g/g | 3.0 | 3.0 | 3.0 | 2.9 |
| Second Reactor Feed Comonomer/ Ethylene Mass Flow Ratio | g/g | 0.03 | 0.05 | 0.05 | 0.07 |
| Second Reactor Feed Hydrogen/ Ethylene Mass Flow Ratio | g/g | 7.2E−04 | 7.3E−04 | 9.7E−04 | 1.1E−03 |
| Second Reactor Temperature | °C. | 195.0 | 195.0 | 195.0 | 195.0 |
| Second Reactor Pressure | barg | 27.0 | 27.0 | 27.0 | 27.0 |
| Second Reactor Ethylene Conversion | % | 92.8 | 91.9 | 91.9 | 92.7 |
| Second Reactor Catalyst Type | Type | Catalyst Component E | Catalyst Component E | Catalyst Component E | Catalyst Component E |
| Second Reactor Catalyst Metal | Type | Zr | Zr | Zr | Zr |
| Second Reactor Co-Catalyst 1 Type | Type | Co-catalyst A | Co-catalyst A | Co-catalyst A | Co-catalyst A |
| Second Reactor Co-Catalyst 2 Type | Type | Co-catalyst B | Co-catalyst B | Co-catalyst B | Co-catalyst B |
| Second Reactor Co-Catalyst 1 to Catalyst Molar Ratio (B to Metal ratio) | mol/mol | 1.2 | 1.2 | 1.2 | 1.2 |
| Second Reactor Co-Catalyst 2 to Catalyst Molar Ratio (Al to Metal ratio) | mol/mol | 465.1 | 451.2 | 453.3 | 352.3 |
| Second Reactor Residence Time | min | 5.6 | 5.9 | 5.5 | 5.5 |

*solvent = Shellsol SBP 100-140

TABLE 2

Catalyst components utilized.

| Catalyst component B | 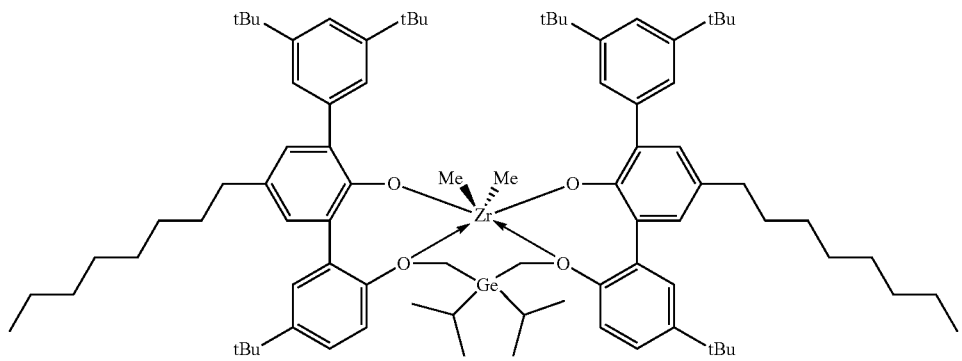 |
|---|---|

TABLE 2-continued

Catalyst components utilized.

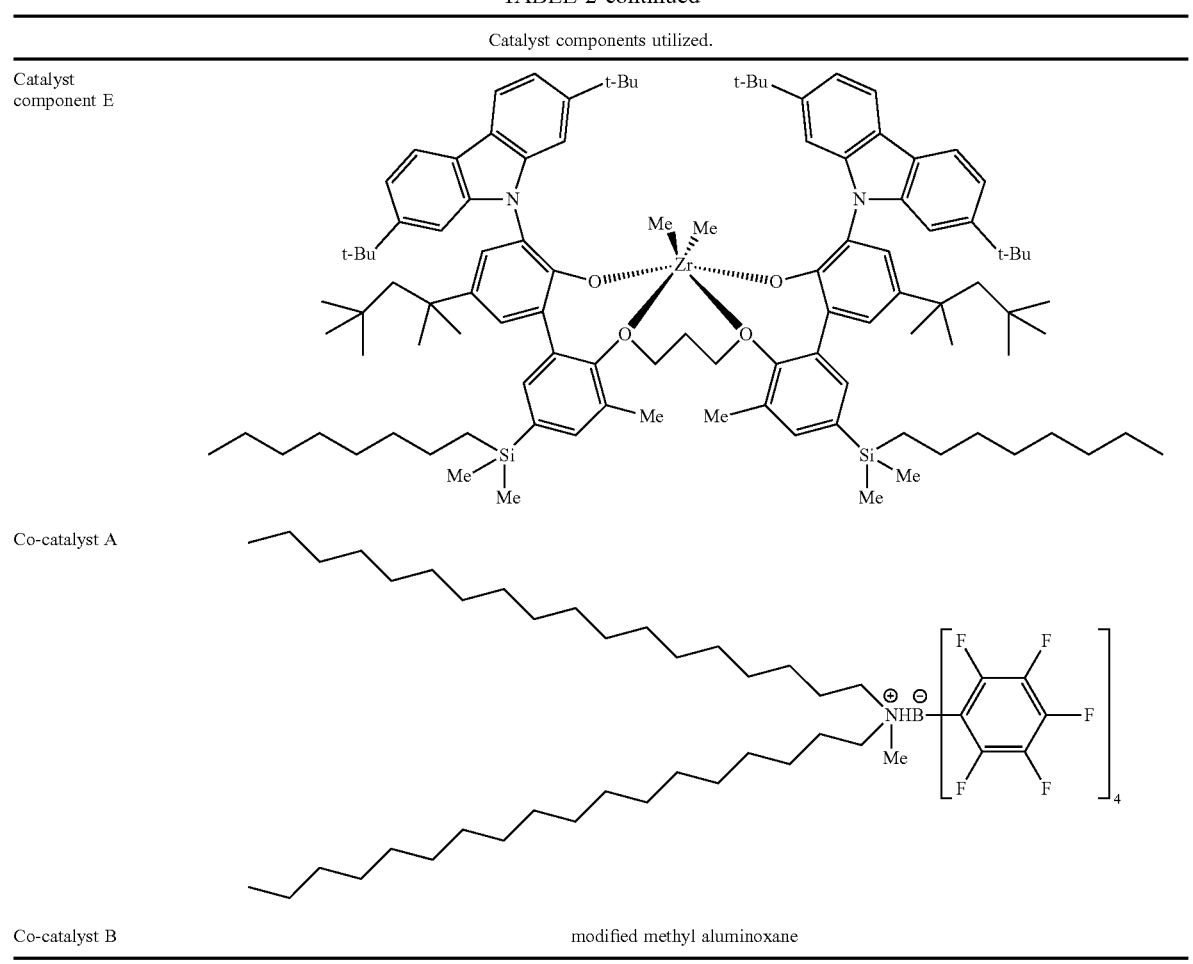

| Catalyst component E | |
| --- | --- |
| Co-catalyst A | |
| Co-catalyst B | modified methyl aluminoxane |

Example 2: Preparation of Polyethylene Composition 5

Polyethylene Composition 5, which is described according to the one or more embodiments of the detailed description, were prepared by a method and utilizing the catalysts and reactors described below.

Polyethylene Composition 5 was prepared utilizing a continuity additive (CA-300 from Univation Technologies, LLC, Houston, Texas, USA), a (methylaluminoxane (MAO) activator, ethylene, hexene, mineral oil (Sonneborn HYDROBRITE 380 PO White), hydrogen gas, and ICA (a mixture consisting essentially of at least 95%, alternatively at least 98% of 2-methylbutane (isopentane, $CH_3(CH_2)_2CH(CH_3)_2$) and minor constituents that at least include pentane $(CH_3(CH_2)_3CH_3))$.

The catalyst utilized was bis(n-propylcyclopentadienyl) hafnium dimethyl (CAS no. 255885-01-9, which may be obtained from BOC Sciences, a brand of BOCSCI Inc., Shirley, New York, USA). To prepare the spray-dried catalyst system utilized in to produce Polyethylene Composition 5, a Büchi B-290 mini spray-drier contained in a nitrogen atmosphere glovebox was set at a temperature of 165° C., and the outlet temperature was set at 60° C. to 70° C. Fumed silica (Cabosil TS-610, 3.2 g), MAO in toluene (10 wt %, 21 g), and bis(propylcyclopentadienyl)hafnium dimethyl (0.11 g) were mixed in toluene (72 g). The resulting mixture was introduced into an atomizing device, producing droplets that were then contacted with a hot nitrogen gas stream to evaporate the liquid therefrom, thereby making a powder. The powder was separated from the gas mixture in a cyclone separator and the sd-Cat-1 was collected as a powder (3.81 g) in a cone can. The sd-Cat-1 may be fed to a gas phase polymerization reactor as a dry powder or as a slurry in mineral oil.

To produce Polyethylene Composition 5, the spray-dried catalyst system prepared as described above was fed to the sd-Cat-1 as a dry powder to a fluidized-bed gas phase polymerization dual reactor system comprising two Pilot FB-GPP Reactors (first reactor and second reactor) comprising beds of polyethylene granules. Polymerization was initiated in the first reactor by continuously feeding the dry sd-Cat-1 catalyst powder, ethylene, hexene and hydrogen ($H_2$) into the fluidized bed of polyethylene granules, while also feeding continuity additive CA-300 as a 20 wt % solution in mineral oil at a feed rate of 3 milliliters per hour (mL/hour). From the first reactor, a unimodal polyethylene polymer was produced and withdrawn, which contained active catalyst. The withdrawn material was transferred to the second reactor using second reactor gas as a transfer medium. Feed ethylene, hexene and hydrogen (but not fresh sd-CAT-1) were fed into the second reactor. Inert gases, nitrogen and isopentane, were used to make up the remaining gas composition in both the first and second reactors. The properties of the polyethylene constituent withdrawn from the first reactor were measured directly on a sample of granular resin of the polyethylene constituent that was made in the first reactor before the polyethylene constituent was transferred into the second reactor. The granular resin was stabilized with 2000 ppmw of butylated hydroxytoluene (BHT) prior to measurements. The Polymerization conditions for the first and second reactors and the properties of the granular resin from the first reactor are reported in Table 3. The polymer withdrawn from the second reactor was blended as granules with 4950 parts per million weight (ppmw) of an antioxidant and UV stabilizer additive, available from Solvay. The combination was fed to a continuous mixer (LCM-100 from Kobe Steel, Ltd.), which is closed coupled to a gear pump and equipped with a melt filtration device and underwater pelletizing system to separately produce strands that are cut into pellets. Overall properties of Polyethylene Composition 5 were measured directly thereon.

TABLE 3

Polymerization Conditions of Polyethylene Composition 5.

| | Reactor 1 | Reactor 2 |
|---|---|---|
| Temperature ° C. | 85 | 85 |
| Pressure, kPa | 2055 | 2362 |
| C2 Part. Pressure, kPa | 434 | 1363 |
| H2/C2 Molar Ratio | 0.00055 | 0.0009 |
| C6/C2 Molar Ratio | 0.0070 | 0.0002 |
| Isopentane (mol %) | 10.0 | 5.0 |
| Catalyst Feed Rate, g/hr | 7.1 | |
| CA300 Feed Rate (ml/hr) | 3.0 | |
| Production Rate (lb/hr) | 15.5 | 19.6 |
| Bed Weight, lbs | 55.1 | 66.1 |
| Split | 44.2% | 55.8% |
| 1st Reactor Melt Index, I2 | 0.53 | |
| 1st Reactor Density | 0.918 | |

Example 3: Comparative Compositions A-C

Table 4 identifies the commercially-available polyethylene compositions of Comparative Polyethylene Compositions A-C.

TABLE 4

Commercially-available Comparative Polyethylene Compositions.

| Comparative Polyethylene Composition | Commercial Name (Company of Manufacture) |
|---|---|
| A | SURPASS ® RMs245-U(UG) (Nova Chemicals) |
| B | SURPASS ® RMs341-U(UG) (Nova Chemicals) |
| C | SURPASS ® RMs539-U(UG) (Nova Chemicals) |

Example 4: Comparative Compositions D-F

Comparative Polyethylene Compositions D-F were prepared by a method and utilizing the catalysts and reactors described below.

All raw materials (monomer and comonomer) and the process solvent (a narrow boiling range high-purity isoparaffinic solvent, Isopar-E) were purified with molecular sieves before introduction into the reaction environment. Hydrogen was supplied pressurized as a high purity grade and was not further purified. The reactor monomer feed stream was pressurized via a mechanical compressor to above reaction pressure. The solvent and comonomer feed was pressurized via a pump to above reaction pressure. The individual catalyst components were manually batch diluted with purified solvent and pressured to above reaction pressure. All reaction feed flows were measured with mass flow meters and independently controlled with computer automated valve control systems.

A two reactor system was used in a series configuration. Each continuous solution polymerization reactor consisted of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds was possible. The total fresh feed stream to each reactor (solvent, monomer, comonomer, and hydrogen) was temperature controlled to maintain a single solution phase by passing the feed stream through a heat exchanger. The total fresh feed to each polymerization reactor was injected into the reactor at two locations with approximately equal reactor volumes between each injection location. The fresh feed was controlled with each injector receiving half of the total fresh feed mass flow. The catalyst components were injected into the polymerization reactor through injection stingers. The primary catalyst component feed was computer controlled to maintain each reactor monomer conversion at the specified targets. The cocatalyst components were fed based on calculated specified molar ratios to the primary catalyst component. Immediately following each reactor feed injection location, the feed streams were mixed with the circulating polymerization reactor contents with static mixing elements. The contents of each reactor were continuously circulated through heat exchangers responsible for removing much of the heat of reaction and with the temperature of the coolant side responsible for maintaining an isothermal reaction environment at the specified temperature. Circulation around each reactor loop was provided by a pump.

In the dual series reactor configuration, the effluent from the first polymerization reactor (containing solvent, monomer, comonomer, hydrogen, catalyst components, and polymer) exited the first reactor loop and was added to the second reactor loop.

The second reactor effluent entered a zone where it is deactivated with the addition of and reaction with a suitable reagent (water). At this same reactor exit location other additives were added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent entered a devolatization system where the polymer is removed from the non-polymer stream. The isolated polymer melt was pelletized and collected. The non-polymer stream passes through various pieces of equipment which separate most of the ethylene which is removed from the system. Most of the solvent and unreacted comonomer was recycled back to the reactor after passing through a purification system. A small amount of solvent and comonomer was purged from the process.

The reactor stream feed data are in Table 5. The data are presented such that the complexity of the solvent recycle system was accounted for and the reaction system could be treated more simply as a once through flow diagram. Table 6 shows the catalysts referenced in Table 5.

TABLE 5

Polymerization Conditions of Comparative Polyethylene Compositions D-E.

| Polyethylene Composition | | Comparative PE Composition D | Comparative PE Composition E |
|---|---|---|---|
| Reactor Configuration | Type | Dual Series | Dual Series |
| Comonomer type | Type | 1-octene | 1-octene |
| First Reactor Feed Solvent/ Ethylene Mass Flow Ratio | g/g | 6.6 | 5.3 |
| First Reactor Feed Comonomer/ Ethylene Mass Flow Ratio | g/g | 0.32 | 0.30 |
| First Reactor Feed Hydrogen/ Ethylene Mass Flow Ratio | g/g | 6.2E−05 | 5.4E−05 |
| First Reactor Temperature | °C. | 170 | 175 |
| First Reactor Pressure | barg | 50 | 50 |
| First Reactor Ethylene Conversion | % | 91.0 | 90.9 |
| First Reactor Catalyst Type | Type | Catalyst Component 1 | Catalyst Component 1 |
| First Reactor Co-Catalyst 1 Type | Type | Co-Catalyst 1 | Co-Catalyst 1 |
| First Reactor Co-Catalyst 2 Type | Type | Co-Catalyst 2 | Co-Catalyst 2 |
| First Reactor Catalyst Metal | Type | Zr | Zr |
| First Reactor Co- Catalyst 1 to Catalyst Molar Ratio (B to Zr ratio) | Ratio | 1.2 | 1.5 |
| First Reactor Co-Catalyst 2 to Catalyst Molar Ratio (Al to Zr ratio) | Ratio | 45.0 | 11.5 |
| First Reactor Residence Time | min | 9.0 | 8.5 |
| Second Reactor Feed Solvent/ Ethylene Mass Flow Ratio | g/g | 2.5 | 2.1 |
| Second Reactor Feed Comonomer/ Ethylene Mass Flow Ratio | g/g | 0.063 | 0.061 |
| Second Reactor Feed Hydrogen/ Ethylene Mass Flow Ratio | g/g | 3.1E−04 | 1.1E−03 |
| Second Reactor Temperature | °C. | 200 | 200 |
| Second Reactor Pressure | barg | 50 | 50 |
| Second Reactor Ethylene Conversion | % | 88.0 | 84.2 |
| Second Reactor Catalyst Type | Type | Catalyst Component 2 | Catalyst Component 2 |
| Second Reactor Co-Catalyst 1 Type | Type | Co-Catalyst 1 | Co-Catalyst 1 |
| Second Reactor Co-Catalyst 2 Type | Type | Co-Catalyst 2 | Co-Catalyst 2 |
| Second Reactor Catalyst Metal | Type | Zr | Zr |
| Second Reactor Co-Catalyst 1 to Catalyst Molar Ratio (B to Metal ratio) | mol/mol | 6.7 | 17.1 |
| Second Reactor Co-Catalyst 2 to Catalyst Molar Ratio (Al to Metal ratio) | mol/mol | >100.0 | >100.0 |
| Second Reactor Residence Time | min | 5.4 | 5.7 |

TABLE 6

Catalyst Components used in the synthesis of Comparative Compositions D-F.

| | |
|---|---|
| Catalyst component 1 | Zirconium, dimethyl[[2,2'''-[[bis[1-methylethyl)germylene]bis(methyleneoxy-kO)]bis[3'',5,5''-tris(1,1-dimethylethyl)-5'-octyl[1,1':3',1''-terphenyl]-2'-olato-kO]](2-)] |
| Catalyst component 2 | Zirconium, dimethyl [[2,2'''-[1,3-propanediylbis(oxy-kO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-kO]](2-)]- |
| Catalyst component 3 | Hafnium, [[2',2'''-[1,2-cyclohexanediylbis(methyleneoxy-.kappa.O)]bis[3-(9H-carbazol-9-yl)-5-methyl[1,1'-biphenyl]-2-olato-.kappa.O]](2-)]dimethyl- |
| Co-catalyst 1 | bis(hydrogenated tallow alkyl)methylammonium tetrakis(pentafluorophenyl)borate(1-) |
| Co-catalyst 2 | modified methyl aluminoxane |
| Co-catalyst 3 | Tri-ethyl aluminum |

Comparative Polyethylene Composition F was prepared by a method and utilizing the catalysts and reactors described below.

All raw materials (monomer and comonomer) and the process solvent (a narrow boiling range high-purity isoparaffinic solvent, Isopar-E) were purified with molecular sieves before introduction into the reaction environment. Hydrogen was supplied pressurized as a high purity grade and is not further purified. The reactor monomer feed stream was pressurized via a mechanical compressor to above reaction pressure. The solvent and comonomer feed was pressurized via a pump to above reaction pressure. The individual catalyst components were manually batch diluted with purified solvent and pressured to above reaction pressure. All reaction feed flows were measured with mass flow meters and independently controlled with computer automated valve control systems.

A two reactor system was used in a parallel configuration. Each continuous solution polymerization reactor consisted of a liquid full, non-adiabatic, isothermal, circulating, loop reactor, which mimiced a continuously stirred tank reactor (CSTR) with heat removal. Independent control of all fresh solvent, monomer, comonomer, hydrogen, and catalyst component feeds was possible. The total fresh feed stream to each reactor (solvent, monomer, comonomer, and hydrogen) was temperature controlled to maintain a single solution phase by passing the feed stream through a heat exchanger. The total fresh feed to each polymerization reactor was injected into the reactor at two locations with approximately equal reactor volumes between each injection location. The fresh feed was controlled with each injector receiving half of the total fresh feed mass flow. The catalyst components were injected into the polymerization reactor through a specially designed injection stingers. The primary catalyst component feed was computer controlled to maintain each reactor monomer conversion at the specified targets. The cocatalyst components were fed based on calculated specified molar ratios to the primary catalyst component. Immediately following each reactor feed injection location, the feed streams were mixed with the circulating polymerization reactor contents with static mixing elements. The contents of each reactor were continuously circulated through heat exchangers responsible for removing much of the heat of reaction and with the temperature of the coolant side responsible for maintaining an isothermal reaction environment at the specified temperature. Circulation around each reactor loop was provided by a pump.

The effluent streams from the first and the second polymerization reactors were combined prior to any additional processing. This final combined reactor effluent entered a zone where it was deactivated with the addition of and reaction with a suitable reagent (water). At this same reactor exit location other additives were added for polymer stabilization (typical antioxidants suitable for stabilization during extrusion and blown film fabrication like Octadecyl 3,5-Di-Tert-Butyl-4-Hydroxyhydrocinnamate, Tetrakis(Methylene (3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent entered a devolatization system where the polymer was removed from the non-polymer stream. The isolated polymer melt was pelletized and collected. The non-polymer stream passed through various pieces of equipment, which separated most of the ethylene, which was removed from the system. Most of the solvent and unreacted comonomer was recycled back to the reactor after passing through a purification system. A small amount of solvent and comonomer is purged from the process.

The reactor stream feed data are in Table 7. The data are presented such that the complexity of the solvent recycle system is accounted for and the reaction system can be treated more simply as a once through flow diagram. Table 6 shows the catalysts referenced in Table 7.

TABLE 7

Polymerization Conditions of Comparative Polyethylene Composition F.

| Polyethylene Composition | | Comparative PE Composition F |
|---|---|---|
| Reactor Configuration | Type | Dual Parallel |
| Comonomer type | Type | 1-octene |
| First Reactor Feed Solvent/ Ethylene Mass Flow Ratio | g/g | 10.4 |
| First Reactor Feed Comonomer/ Ethylene Mass Flow Ratio | g/g | 0.33 |
| First Reactor Feed Hydrogen/ Ethylene Mass Flow Ratio | g/g | 6.6E−05 |
| First Reactor Temperature | ° C. | 160 |
| First Reactor Pressure | barg | 50 |
| First Reactor Ethylene Conversion | % | 90.6 |
| First Reactor Catalyst Type | Type | Catalyst component 1 |
| First Reactor Co-Catalyst 1 Type | Type | Co-catalyst 1 |
| First Reactor Co-Catalyst 2 Type | Type | Co-catalyst 2 |
| First Reactor Catalyst Metal | Type | Zr |
| First Reactor Co-Catalyst 1 to Catalyst Molar Ratio (B to Metal ratio) | Ratio | 2.0 |
| First Reactor Co-Catalyst 2 to Catalyst Molar Ratio (Al to Metal ratio) | Ratio | 46.7 |
| First Reactor Residence Time | min | 7.7 |
| Second Reactor Feed Solvent/ Ethylene Mass Flow Ratio | g/g | 2.5 |
| Second Reactor Feed Comonomer/ Ethylene Mass Flow Ratio | g/g | 0.048 |
| Second Reactor Feed Hydrogen/ Ethylene Mass Flow Ratio | g/g | 4.0E−04 |
| Second Reactor Temperature | ° C. | 195 |
| Second Reactor Pressure | barg | 50 |
| Second Reactor Ethylene Conversion | % | 93.7 |
| Second Reactor Catalyst Type | Type | Catalyst component 2 |
| Second Reactor Co-Catalyst 1 Type | Type | Co-catalyst 1 |
| Second Reactor Co-Catalyst 2 Type | Type | Co-catalyst 2 |
| Second Reactor Catalyst Metal | Type | Zr |
| Second Reactor Co-Catalyst 1 to Catalyst Molar Ratio (B to Metal ratio) | mol/mol | 12.0 |
| Second Reactor Co-Catalyst 2 to Catalyst Molar Ratio (Al to Metal ratio) | mol/mol | >100.0 |
| Second Reactor Residence Time | min | 22.9 |

Example 5: Comparison of Polyethylene Compositions 1-5 and Comparative Compositions A-F The properties of Comparison of Polyethylene Compositions 1-5 and Comparative Compositions A-F were measured and calculated according to the test methods described herein and are reported in Tables 8-10. FIG. 1 graphically depicts the elution profile of Polyethylene Composition 1, according to one or more embodiments presently described.

TABLE 8

Properties of Polyethylene Compositions 1-5 and Comparative Compositions A-F.

|  | First PE fraction area (70-97° C.) | Second PE fraction area (97-110° C.) | Ratio of $Mw_{(iCCD,\ overall)}$ to $Mw_{(iCCD,\ 70-97°\ C.)}$ | Ratio of wt. fraction (70-97° C.) to wt. fraction (97-110° C.) | wt. fraction (<95° C.)[1] |
|---|---|---|---|---|---|
| PE 1 | 47.0% | 52.2% | 0.77 | 0.90 | 41% |
| PE 2 | 43.7% | 56.0% | 0.71 | 0.78 | 38% |
| PE 3 | 48.8% | 50.3% | 0.75 | 0.97 | 44% |
| PE 4 | 52.3% | 46.9% | 0.74 | 1.11 | 45% |
| PE 5 | 52.3% | 46.9% | 0.89 | 1.12 | 49% |
| Comp. PE A | 71.7% | 27.5% | 0.93 | 2.61 | 33% |
| Comp. PE B | 79.2% | 20.0% | 0.94 | 3.96 | 57% |
| Comp. PE C | 83.0% | 16.1% | 0.97 | 5.14 | 65% |
| Comp. PE D | 54.6% | 37.7% | 0.74 | 1.45 | 56% |
| Comp. PE E | 63.5% | 20.7% | 0.82 | 3.07 | 73% |
| Comp. PE F | 53.5% | 40.0% | 0.69 | 1.34 | 56% |

TABLE 9

Properties of Polyethylene Compositions 1-5 and Comparative Compositions A-F.

|  | Density (g/cm³) | MI (g/10 min) | MWD | CDBI50 | CDBI25 | ZSVR | ESCR F50 (10%, A) hr | IDI * (J) |
|---|---|---|---|---|---|---|---|---|
| PE 1 | 0.948 | 2.0 | 2.9 | 18% | 8% | 1.6 | >1,000 | 32.0 |
| PE 2 | 0.947 | 1.8 | 3.1 | 20% | 10% | 1.8 | >1,000 | 32.5 |
| PE 3 | 0.945 | 4.7 | 2.8 | 18% | 8% | 1.4 | 348 | 30.2 |
| PE 4 | 0.947 | 3.2 | 3.4 | 23% | 11% | N/a | >1,000 | 30.7 |
| PE 5 | 0.939 | 1.5 | 3.3 | 13% | 6% | 1.1 | >1,000 | 33.1 |
| Comp. PE A | 0.945 | 1.7 | 3.9 | 79% | 52% | 1.4 | 79 | 32.1 |
| Comp. PE B | 0.941 | 3.6 | 3.2 | 69% | 36% | 1.3 | 18 | 37.5 |
| Comp. PE C | 0.939 | 5.2 | 3.2 | 59% | 29% | 1.3 | 17 | 36.2 |
| Comp. PE D | 0.928 | 0.85 | 3.5 | 14% | 6% | 1.7 | >1,000 | 41.6 |
| Comp. PE E | 0.928 | 0.85 | 5.0 | 52% | 31% | 1.9 | >1,000 | 42.8 |
| Comp. PE F | 0.930 | 0.50 | 4.3 | 11% | 5% | 1.6 | >1,000 | 42.5 |

[1]Weight fraction of components eluting at a temperature >95° C. in an elution profile via improved comonomer composition distribution (iCCD)

TABLE 10

Properties of Polyethylene Compositions 1-5, Comparative Compositions A-F.

|  | $I_{10}/I_2$ | $Mw_{(GPC)}$ | $Mz_{(GPC)}$ | $Mz_{(GPC)}/Mw_{(GPC)}$ |
|---|---|---|---|---|
| PE 1 | 7.9 | 90,847 | 223,631 | 2.5 |
| PE 2 | 9.3 | 94,578 | 265,831 | 2.8 |
| PE 3 | 7.9 | 73,944 | 179,345 | 2.4 |
| PE 4 | 8.8 | 82,542 | 231,061 | 2.8 |
| PE 5 | 6.3 | 103,578 | 226,765 | 2.2 |
| Comp. PE A | 7.1 | 98,481 | 284,712 | 2.9 |
| Comp. PE B | 7.3 | 79,241 | 190,999 | 2.4 |
| Comp. PE C | 6.7 | 70,982 | 158,253 | 2.2 |
| Comp. PE D | 8.7 | 117,565 | 333,005 | 2.8 |
| Comp. PE E | 7.7 | 112,320 | 325,952 | 2.9 |
| Comp. PE F | 8.6 | 129,586 | 340,548 | 2.6 |

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A polyethylene composition comprising:
   a first polyethylene fraction area defined by an area in an elution profile via improved comonomer composition distribution (iCCD) analysis method in a temperature range of 70° C. to 97° C.;
   a first peak in the temperature range of 70° C. to 97° C. in the elution profile;
   a second polyethylene fraction area defined by an area in the elution profile in a temperature range of 97° C. to 110° C.; and
   a second peak in the temperature range of 97° C. to 110° C. in the elution profile; and
   wherein the polyethylene composition has a density of 0.935 g/cm³ to 0.955 g/cm³, a melt index ($I_2$) of 1.0 g/10 minutes to 10.0 g/10 minutes, and wherein a ratio of the first polyethylene fraction area to the second polyethylene fraction area is less than 2.0.

2. The polyethylene composition of claim 1, wherein the polyethylene composition has a molecular weight distribution, expressed as the ratio of the weight average molecular weight to number average molecular weight ($Mw_{(GPC)}/Mn_{(GPC)}$) in the range of from 2.0 to 4.5.

3. The polyethylene composition of claim 1, wherein the second polyethylene fraction area may comprise from 30% to 80% of the total area of the elution profile.

4. The polyethylene composition of claim 1, wherein the polyethylene composition has a comonomer distribution breadth index 50 (CDBI50) of less than or equal to 50%.

5. The polyethylene composition of claim 1, wherein the polyethylene composition has an overall molecular weight determined by iCCD ($Mw_{(iCCD)}$), the first polyethylene fraction has a first fraction molecular weight determined by iCCD ($Mw_{(iCCD,\ 70°\ C.\text{-}97°\ C.)}$), and a ratio of the overall molecular weight ($Mw_{(iCCD)}$) to the first fraction molecular weight ($Mw_{(iCCD,\ 70°\ C.\text{-}97°\ C.)}$) is less than 0.9.

6. The polyethylene composition of claim 1, wherein the polyethylene composition has a zero shear viscosity ratio of less than 2.0.

7. The polyethylene composition of claim 1, wherein the polyethylene composition has an environmental stress crack resistance (ESCR) F50 (10%, A) of greater than 300 hours when measured according to D1693.

8. A polyethylene composition comprising:
a first polyethylene fraction in a temperature range of 70° C. to 97° C. in an elution profile via improved comonomer composition distribution (iCCD) analysis method, the first polyethylene fraction comprising a first peak, and wherein the first polyethylene fraction has a first fraction molecular weight determined by iCCD ($Mw_{(iCCD,\ 70°\ C.\text{-}97°\ C.)}$); and
a second polyethylene fraction in a temperature range of 97° C. to 110° C. in the elution profile, the second polyethylene fraction comprising a second peak;
wherein the polyethylene composition has an overall molecular weight determined by iCCD ($Mw_{(iCCD)}$), a density of 0.935 g/cm³ to 0.955 g/cm³, a melt index ($I_2$) of 1.0 g/10 minutes to 10.0 g/10 minutes; and
wherein and a ratio of the overall molecular weight ($Mw_{(iCCD)}$) to the first fraction molecular weight ($Mw_{(iCCD,\ 70°\ C.\text{-}97°\ C.)}$) is less than 0.9.

9. The polyethylene composition of claim 8, wherein the polyethylene composition has a molecular weight distribution, expressed as the ratio of the weight average molecular weight to number average molecular weight ($Mw_{(GPC)}/Mn_{(GPC)}$) in the range of from 2.0 to 4.5.

10. The polyethylene composition of claim 8, wherein the second polyethylene fraction area may comprise from 30% to 80% of the total area of the elution profile.

11. The polyethylene composition of claim 8, wherein the polyethylene composition has a CDBI50 of less than or equal to 50%.

12. The polyethylene composition of claim 8, wherein and a ratio of the first mass fraction to the second mass fraction is less than 2.0.

13. The polyethylene composition of claim 8, wherein the polyethylene composition has a zero shear viscosity ratio of less than 2.0.

14. The polyethylene composition of claim 8, wherein the polyethylene composition has an ESCR F50 (10%, A) of greater than 300 hours when measured according to D1693.

15. A method of producing a rotomolded article comprising the polyethylene composition of claim 8.

* * * * *